July 11, 1967  G. KAESS  3,330,193
CAMERA APPARATUS
Filed Dec. 30, 1964  12 Sheets-Sheet 4

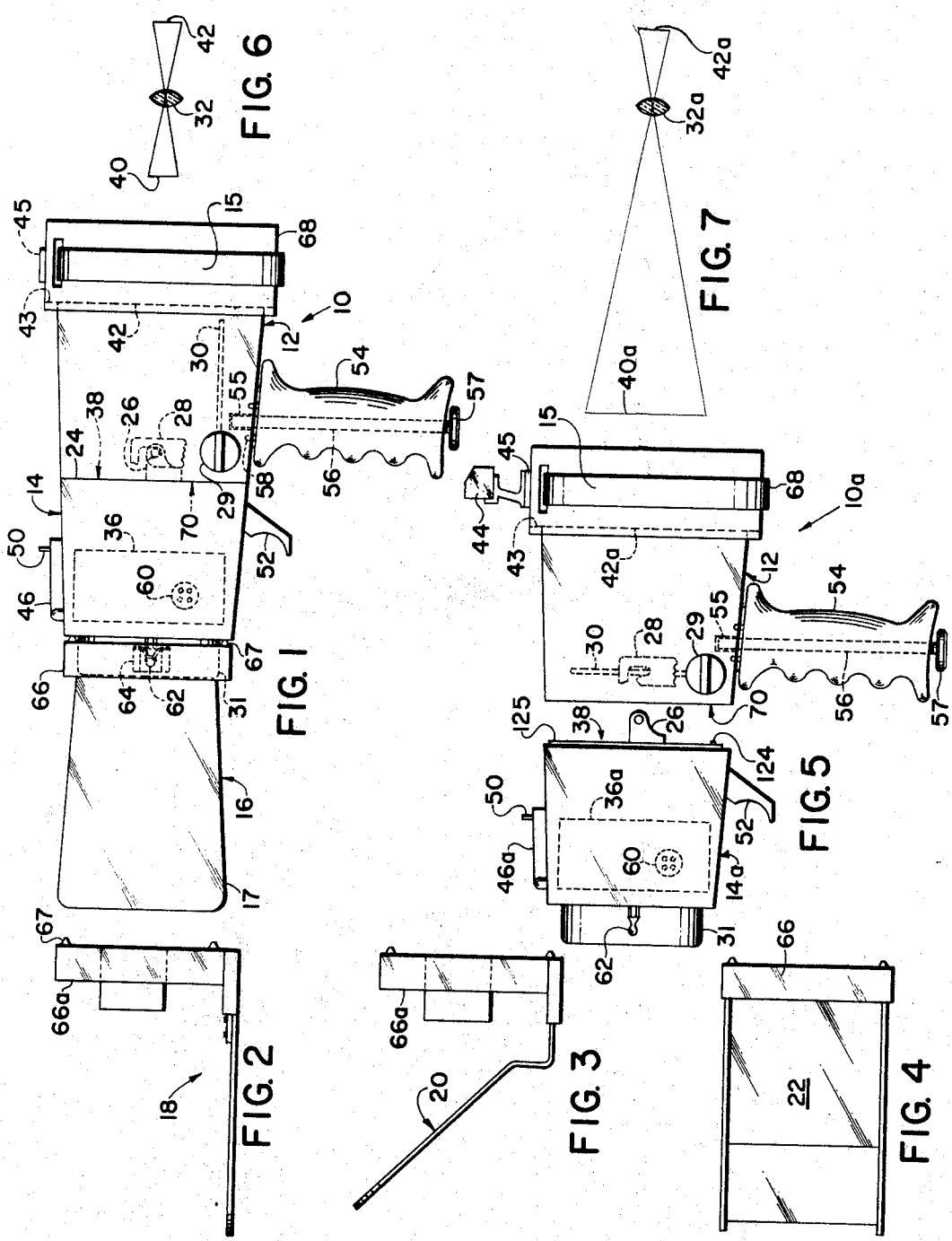

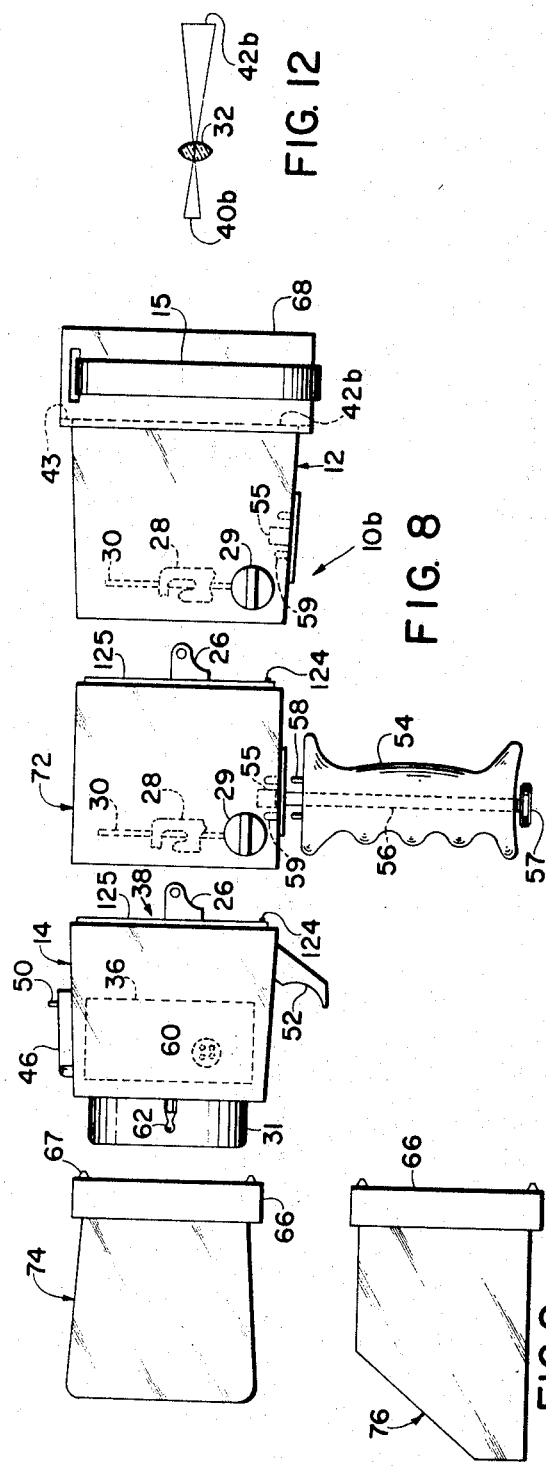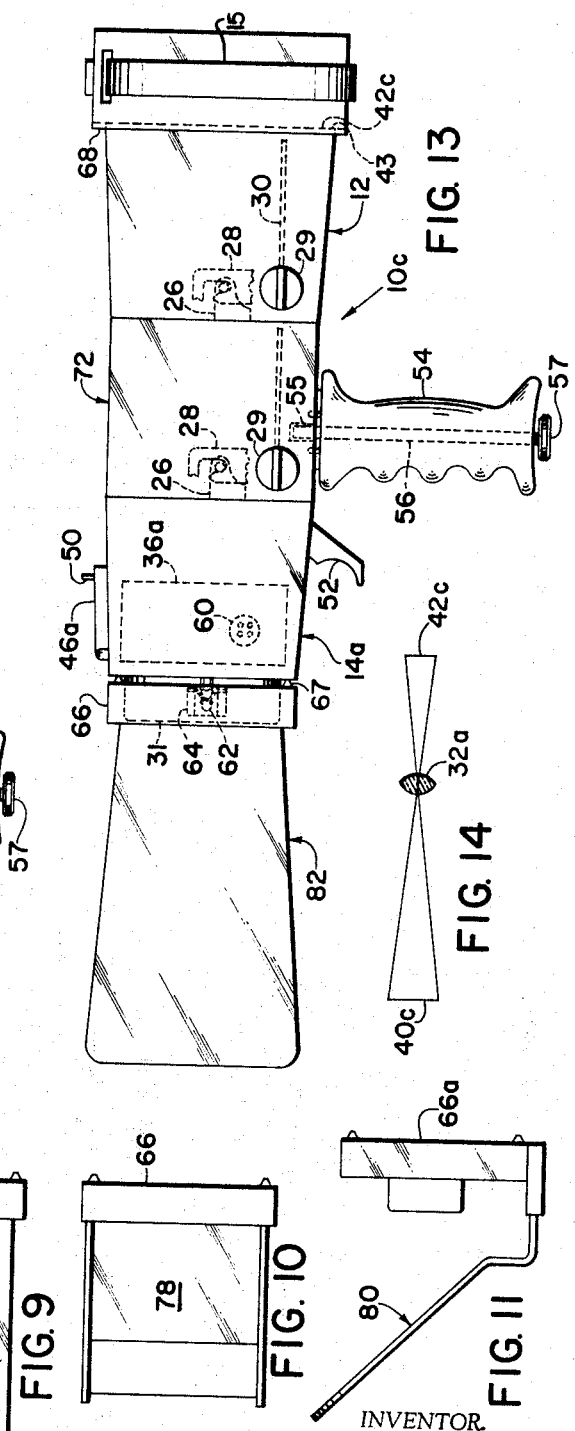

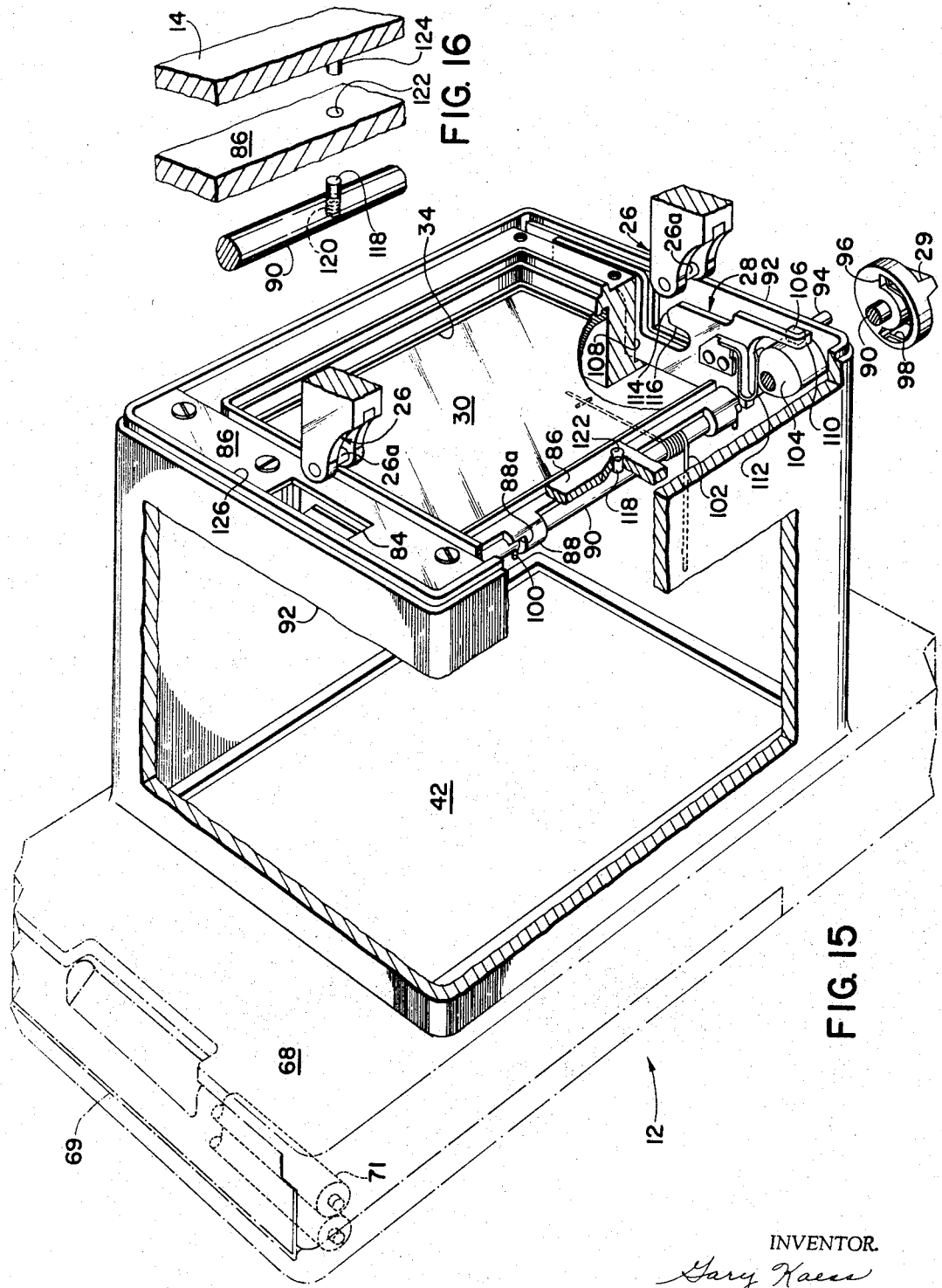

INVENTOR
Gary Kaess
BY Brown and Mikulka
ATTORNEYS

INVENTOR
Gary Kaess
BY Brown and Mikulka
ATTORNEYS

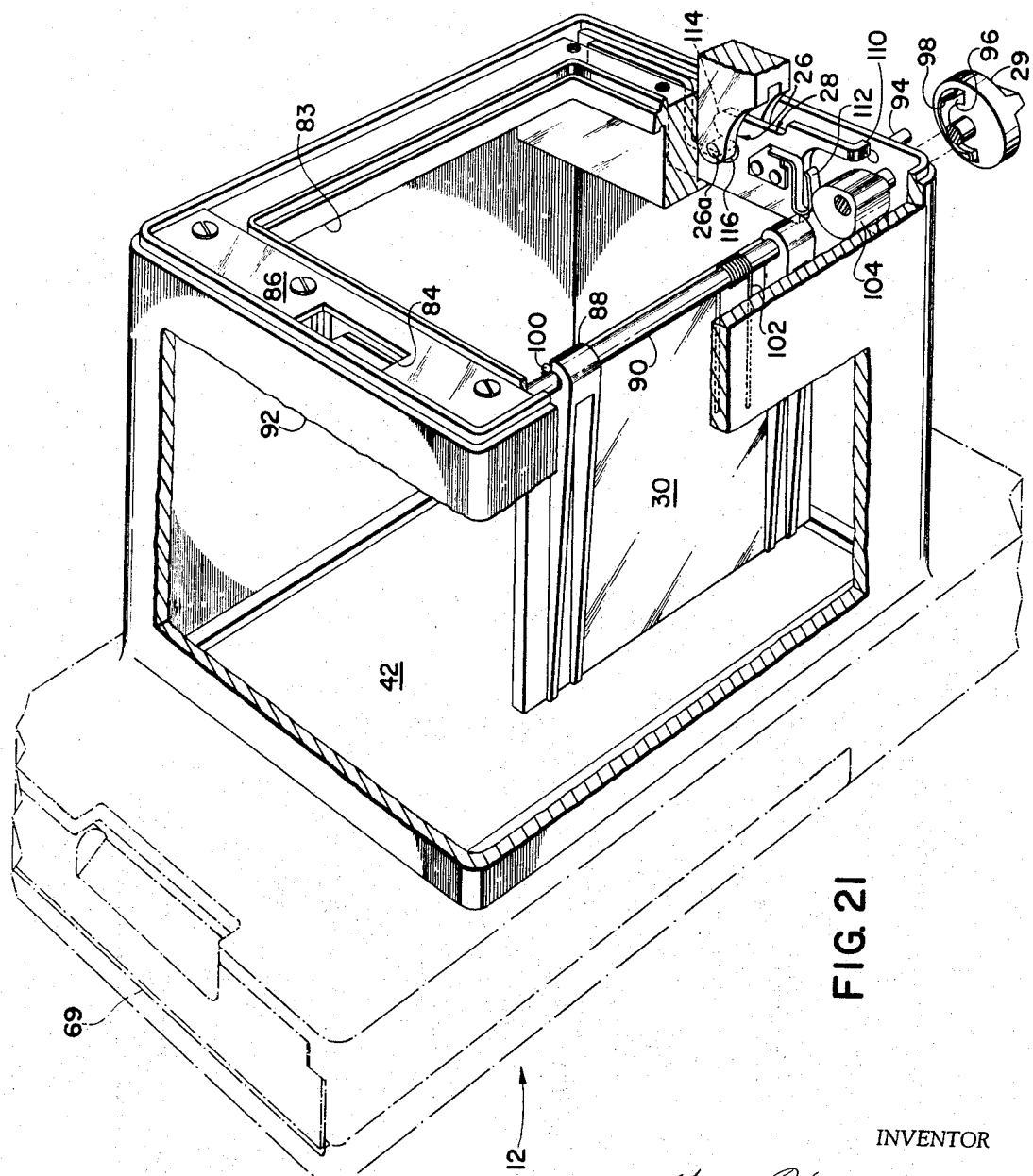

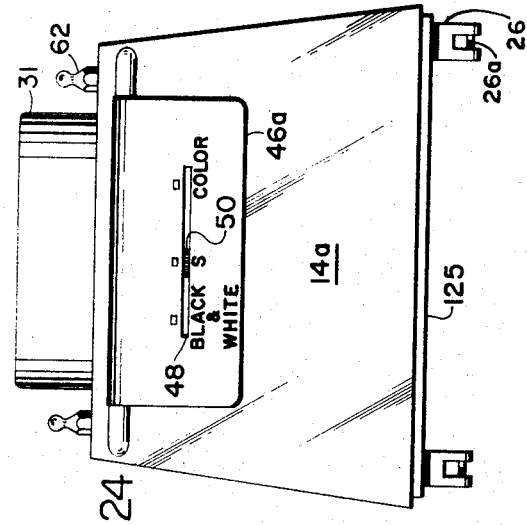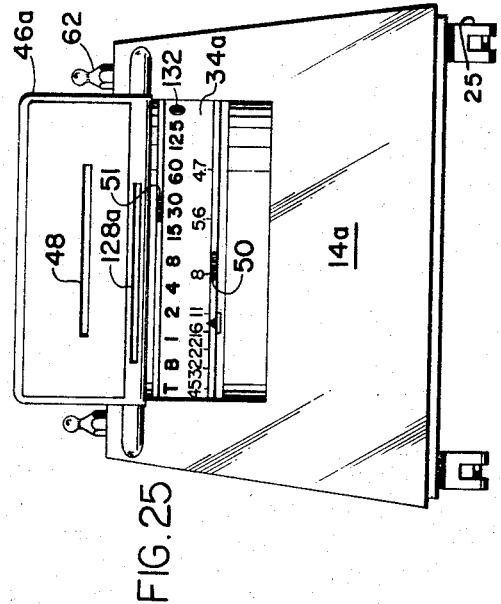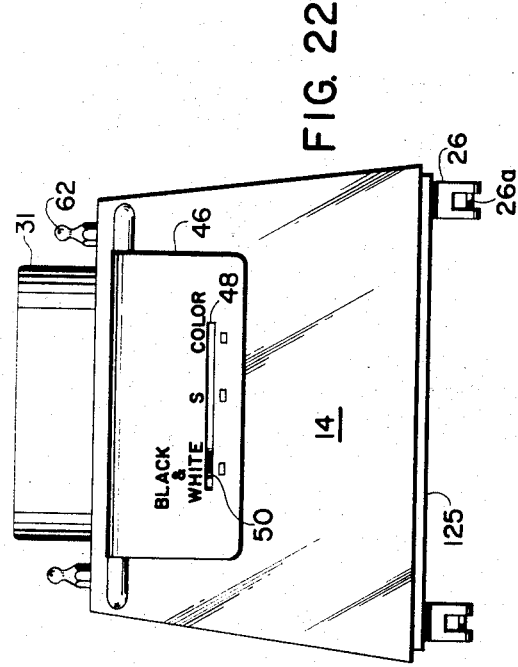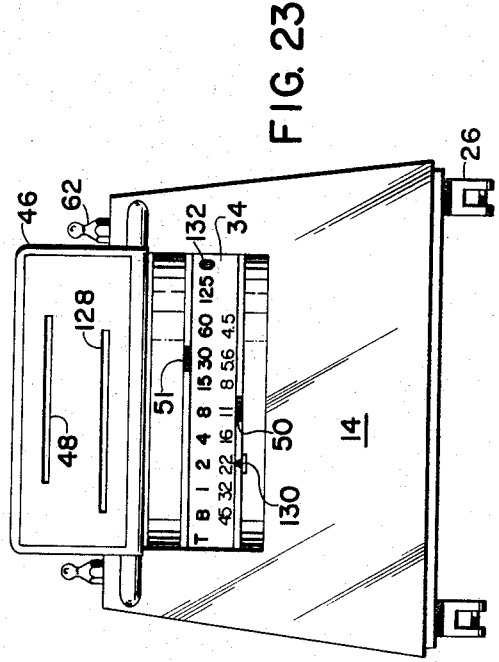

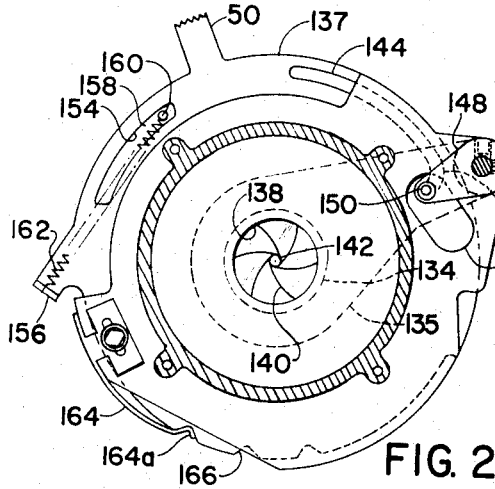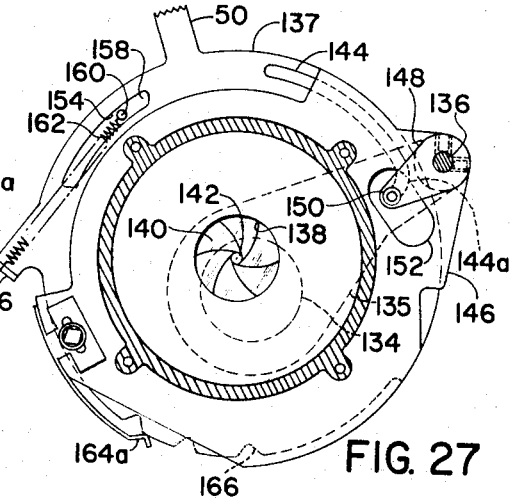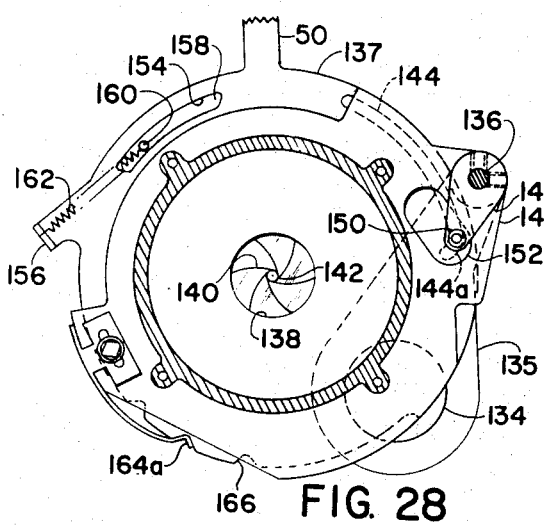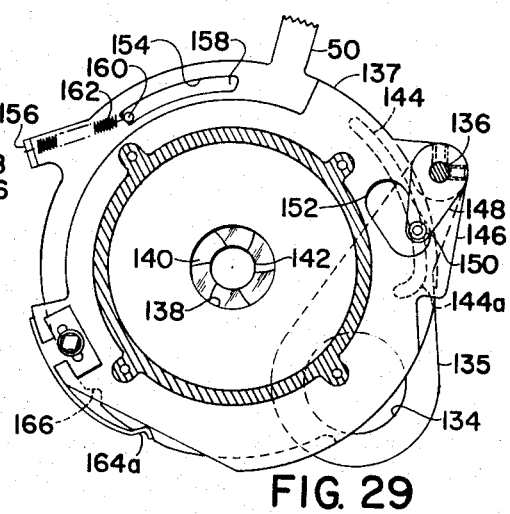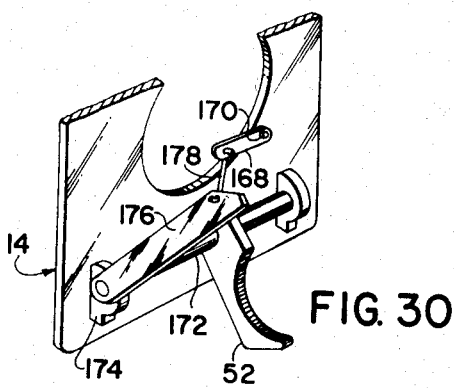

July 11, 1967   G. KAESS   3,330,193
CAMERA APPARATUS
Filed Dec. 30, 1964   12 Sheets-Sheet 9

INVENTOR
Gary Kaess
BY Brown and Mikulka
ATTORNEY

July 11, 1967

G. KAESS 3,330,193

CAMERA APPARATUS

Filed Dec. 30, 1964

INVENTOR

*Gary Kaess*

BY *Brown and Mikulka*

ATTORNEYS

July 11, 1967  G. KAESS  3,330,193
CAMERA APPARATUS
Filed Dec. 30, 1964
12 Sheets-Sheet 11
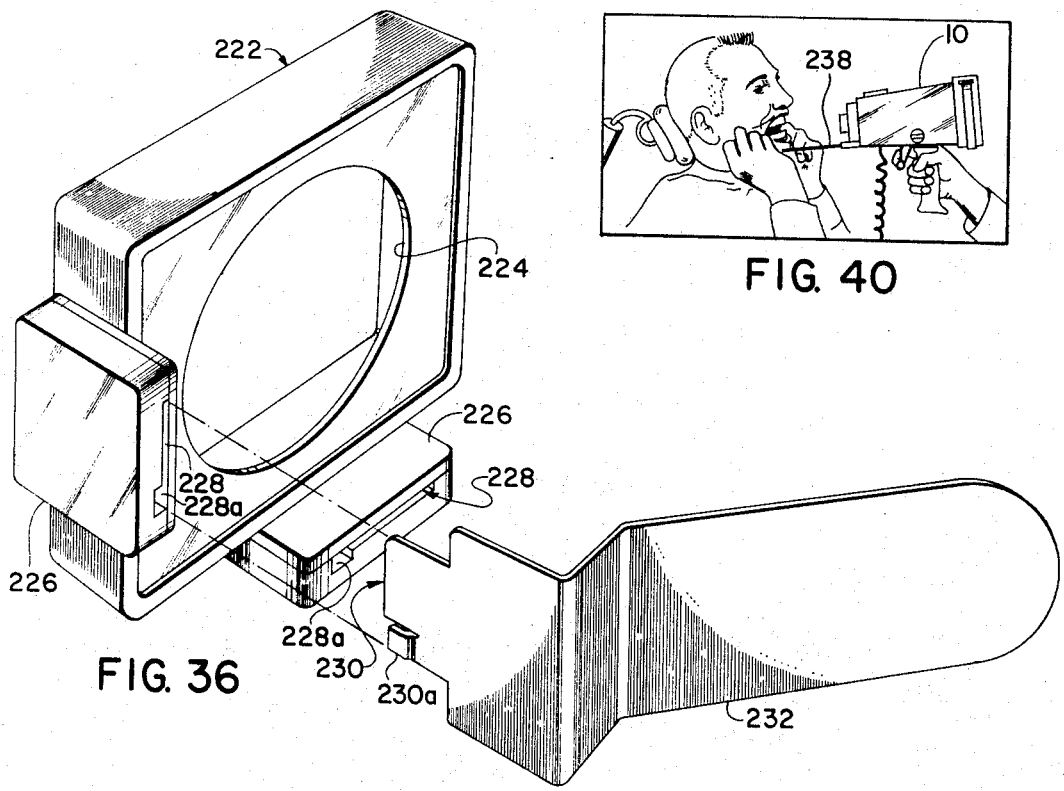
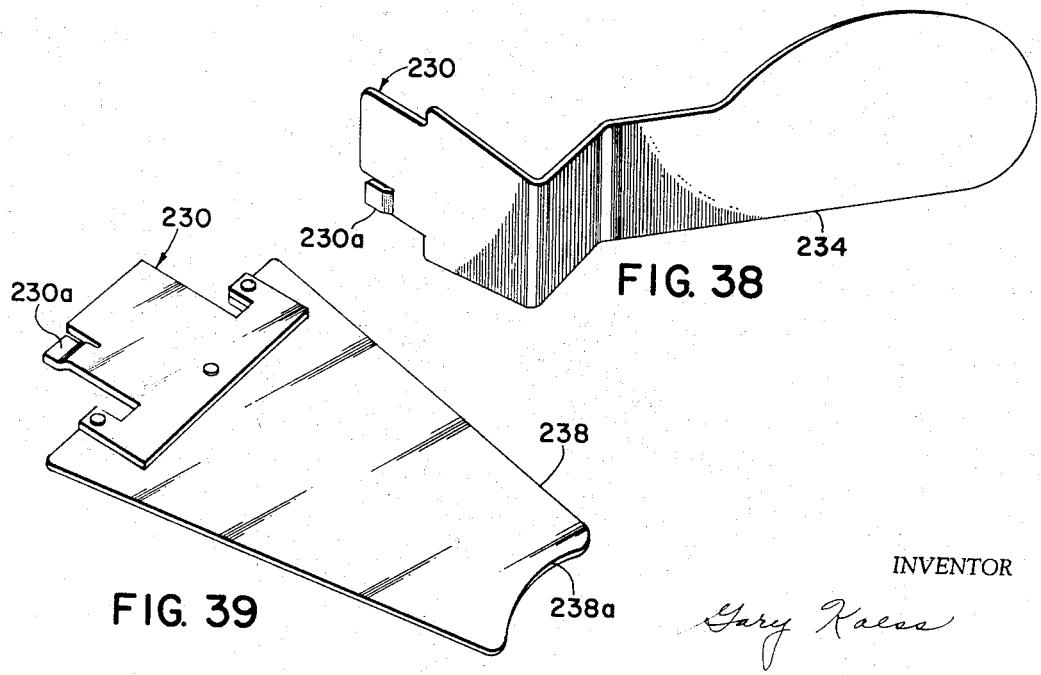
INVENTOR
Gary Kaess
BY Brown and Mikulka
ATTORNEYS July 11, 1967  G. KAESS  3,330,193

CAMERA APPARATUS

Filed Dec. 30, 1964

INVENTOR
Gary Kaess

BY Brown and Mikulka
ATTORNEYS

United States Patent Office 3,330,193
Patented July 11, 1967

3,330,193
CAMERA APPARATUS
Gary Kaess, West Newton, Mass., assignor to Polaroid Corporation, Cambridge, Mass., a corporation of Delaware
Filed Dec. 30, 1964, Ser. No. 422,149
14 Claims. (Cl. 95—11)

This invention relates to a camera capable of rapidly producing finished photographic prints in black-and-white or color for use in the sphere of so-called "close-up" photography. More specifically, it concerns an improved "professional-type" camera of the character described for producing consistently, with fidelity of minute detail, a wide variety of "close-up" photographs through rapid and easily-performed substitution of its basic components to make available a broad range of subject field sizes and magnifications.

The camera of the present invention more specifically includes the self-processing feature of cameras manufactured by Polaroid Corporation of Cambridge, Mass., U.S.A. As such, it is adapted to use film materials identified with these cameras and is capable of providing a completed black-and-white or full-color photographic print within a few seconds following a photographic exposure and without requiring any delay in making a subsequent exposure, processing being completed outside of the camera. The camera is extremely simple to operate, flexible in performance, and enables the taking of pictures of consistent quality, in rapid succession and at short range, of an extremely wide selection of subject matter, without the need of customary focus and exposure computations. It offers a choice of magnification and other subject-image ratios not usually obtainable in a single instrument, as permitted by various combinations of its interchangeable components. In this connection, the camera is particularly adapted to use in scientific fields including those of medicine, dentistry, the photographing of miniature mechanisms and machine parts, criminal investigation and identification, the examination of documents, philatelic and numismatic studies, and the like, that is, wherever it is of advantage to photographically inspect subject material at close range, to reproduce extremely fine detail and to obtain an immediate, accurate, visible photographic record.

In contrast to conventional close-range cameras which embody continuously-adjustable mechanisms and perhaps separate measuring means for establishing various lens-to-subject and lens-to-film-plane distances to achieve different magnifications, the present camera is an assembly composed of rapidly-interchangeable basic components or sections, each of which, in conjunction with an accompanying interrelated series of attachments or accessories, provides a given magnification or other size relation and a predetermined field of view without the need of complicated settings or adjustments. For any given assembly of the aforesaid components the usual variables of photography: light, focus, and field size are held constant. Thus, time-consuming computations involving delays, perhaps inconsistent results and possible margins for error in making an exposure, where a slight miscalculation could result in a blurred image, an incorrect magnification, an incomplete field area, or some other deficiency are effectively eliminated.

In accordance with the foregoing considerations, objects of the present invention are to provide a self-processing short-range camera which permits an improved range of magnifications; to provide a portable camera of the character described wherein processing of film materials is initiated within and completed outside of the camera to permit the taking of a rapid succession of pictures; to provide such a camera in which the different magnifications are obtainable in positive steps through the use of readily-mounted and rapidly-interchangeable housing sections or components involving lens and other options, thus eliminating time-consuming adjustments and the possibility of erroneous settings; to provide a short-range or "close-up" camera in which latching means of the aforesaid sections permit their rapid interchange; to provide a camera, as described, incorporating a plurality of attachments or accessories enabling a particularly wide field of usage; to provide a close-up type of camera having an efficient built-in source of electronic flash illumination especially adapted to the ranges and subject matter involved; to provide a camera, as stated, with alternative AC and DC power supplies and associated light-level control means; to provide a "close-up" camera of the stated category in which the shutter speed and diaphragm opening are maintained constant for a given working light-level and in which the field of view is predetermined; to provide a camera of the character described embodying film-processing means for producing a completed print either in black-and-white or in full-color, within a few seconds of a photographic exposure; to provide a camera having stable support means for facilitating the processing of film assemblies containing a releasable processing liquid; to provide a "close-up" camera in which the depth of field is held constant with interchange of camera sections; to provide a camera of the type described including a plurality of selectively mountable front sections which contain lens means of different focal length adapted to function with a built-in electronic flash ring-light producing a given functional light-level or a choice of light levels; to provide a "close-up" camera embodying a novel light-directing component or accessory for use in photographing a fingerprint or other subject carried by a smooth highly-reflecting surface, directly and in improved detail and contrast; to provide a camera of the character described which includes a focusing lens attachment for conventional photographic use; to provide a camera, as described, embodying a variable-position pistol grip for convenience and flexibility of operation; and to provide a camera embodying a plurality of releasably-attached sections and attachments which can be separated and readily stored in a carrying case for improved portability.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic side view of a camera assembly of the invention;

FIGS. 2, 3 and 4 are diagrammatic side views of accessories or attachments for incorporation with the camera assembly of FIGURE 1;

FIG. 5 is a diagrammatic side view of a modification of the camera assembly of FIGURE 1;

FIGS. 6 and 7 are optical diagrams relating to the camera assemblies of FIGS. 1 and 5, respectively;

FIG. 8 is a diagrammatic side view of another modification of the camera assembly;

FIGS. 9, 10 and 11 are diagrammatic side views of accessories or attachments for incorporation with the camera assembly of FIG. 8;

FIG. 12 is an optical diagram relating to the camera of FIG. 8;

FIG. 13 is a diagrammatic side view of a further modification of the camera assembly;

FIG. 14 is an optical diagram relating to the camera of FIG. 13;

FIG. 15 is a diagrammatic perspective view, partly in section and with parts broken away, of a cooperating latch and door mechanism of one section of the camera assembly of the invention;

FIG. 16 is an enlarged view of a portion of the mechanism of FIG. 15;

FIGS. 17 through 21 are diagrammatic perspective views of the mechanism of FIG. 15 illustrating a sequence of operations thereof;

FIGS. 22 through 25 are diagrammatic plan views of diaphragm and shutter control elements of each front section of the camera assembly, illustrating the operation thereof;

FIGS. 26 through 29 are diagrammatic, rear views of cooperating diaphragm and filter mechanism of the camera illustrating a sequence of operations thereof;

FIG. 30 is a diagrammatic perspective view of a shutter release mechanism of the camera;

FIGS. 36 through 39 are diagrammatic perspective views of an adapter and dental accessories attachable thereto, for use with the camera assemblies of FIGS. 1 and 8;

FIG. 40 is a diagrammatic side view of a camera and attached dental accessory of the invention, illustrating the photographic use thereof with respect to a human subject.

Figure 17:
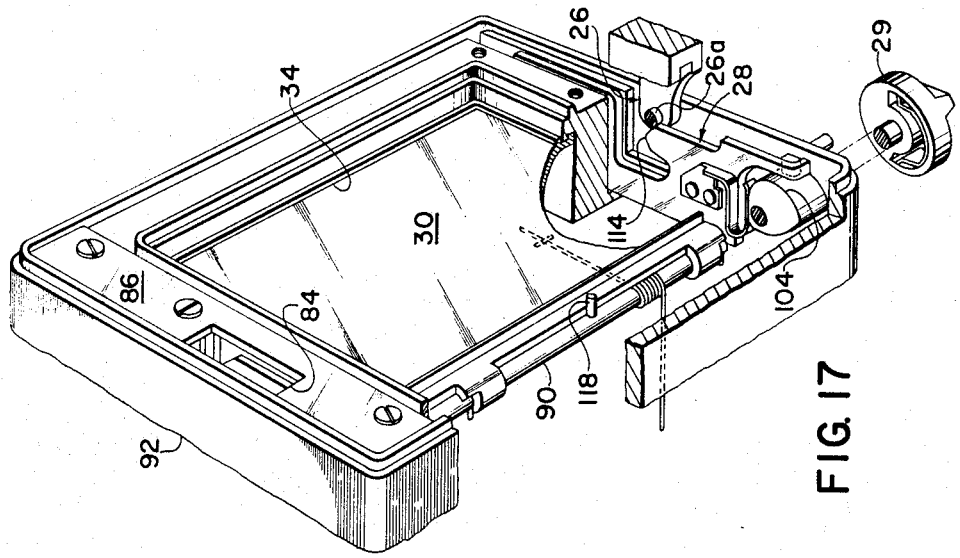

Referring now to FIGURE 1, the basic camera 10 of the invention is shown in side elevation. It is composed of a rear housing or section 12 adapted to contain photosensitive film material and a front housing or section 14 containing the lens and exposure mechanism, the two sections being adapted either to separation or joining together, manually. The terms "front" or "forward" and "rear" or "back" are used herein to denote proximity to or remoteness from the camera front or lens assembly. Each camera section is of a generally rectangular shape, tapers slightly from rear-to-front, and, basically, comprises a housing composed of a metal such as die-cast aluminum, within or upon which various elements of the camera are mounted. A carrying-strap 15 is provided. Accompanying the two-section assembly are the several accessories, or attachments, 16, 18, 20 and 22, releasably-attachable to the front section 14, the accessory 16 being shown thus attached. The accessories are interchangeable components essential to the performance of various photographic functions to be more fully described below. In brief, the accessory 16 is a general-purpose element comprising a pair of laterally spaced, forwardly-extending, metallic plate-like elements 17 and a base or adapter 66 to which the elements 17 are attached. This accessory serves both in a spacing and supporting capacity and provides a distance of approximately 6 inches from lens to subject. Moreover, it may be employed as a stable support, with the extremities of the elements 17 at 90° to the optical axis of the camera, for holding the camera positioned vertically on a horizontal supporting surface to facilitate both photography at this position and a linear withdrawal of a film assembly from the rear section 12 to effect its processing. A firm position of the camera is important when processing color film wherein steadiness and linearity of film withdrawal are practically essential to obtain correct colors and to avoid blemishes in the prints. To further a stable footing of the support 17, the leading edges or extremities thereof may have a thin coating of a non-slipping substance applied thereto such as a synthetic rubber material or the like. The accessories 18 and 20 are primarily intended for intra-oral photography in the dental field at a similar distance. The accessory 22 is intended for direct photography, at approximately 6 inches, of fingerprints or other subject matter carried on a smooth, reflective surface wherein it is necessary to eliminate surface-reflections which would impair contrast in the image. All of the accessories will be understood as having at least a spacing function, whether or not they possess an additional function. The camera assembly of FIGURE 1, with any of the aforesaid accessories, provides a 1:1 or life-size object-image relation.

An alternate front section 14a, having a lens of different optical characteristics, is provided for combination with the rear section 12 to produce the camera assembly 10a of FIG. 5. This combination provides a 1/4:1 or quarter life-size image-to-object ratio. No front-attached accessories are shown for use with the camera assembly 10a although such accessories may be provided, as required.

The selected front section, 14 or 14a, as the case may be, is releasably joined to and locked with the rear section 12 along the joining line 24 by a pair of projecting, horizontally-disposed, clevis- or fork-like latch members 26 of the front section which are adapted to engage a pair of linearly movable, recessed, horizontally-disposed latch members 28 of the rear section 12. The latch members 28 are actuated by a knob 29 which, by means of interlocking mechanism, also operates a pivotal opaque baffle or door 30 serving as a closure for the substantially open front of the rear section 12. The baffle 30, including a light-sealing flange 34, is employed to protect photosensitive film materials carried by the rear section 12 against an unwanted entrance of light, whenever the front and rear sections are disassembled. Operation of the baffle 30 will be described in detail hereinafter. The combined front and rear sections provide a distance of approximately 6 inches from the lens to a photosensitive film material positioned for exposure at an image plane.

Each of the front sections 14 or 14a, includes an identical electronic flash unit 31 producing an exposure flash of given intensity and duration as, for example, one of approximately 1/500 second duration, and contains a lens assembly 32 or 32a, respectively, an iris-type diaphragm and a between-the-lens shutter, not shown, the complete assembly of lens, diaphragm and shutter being indicated at 36 and 36a. The flash unit 31 is in the form of a built-in ring-light surrounding the front of the lens aperture. While each lens assembly is shown, for simplicity, as a single element in the diagrams of FIGS. 6 and 7, it is, actually, a multi-component element, e.g., a four-element lens. As incorporated with the front section 14 it is, for example, an f/4.5 to f/45 lens of 75 mm. (3-inch) focal length. As identified with the front section 14a it is an f/4.7 to f/45 lens of 127 mm. (5-inch) focal length. The complete lens-diaphragm-shutter assembly, designated 36 for the 3-inch lens in FIGURE 1 and 36a for the 5-inch lens in FIG. 5, may, for example, be of the type of a "Prontor Press" unit manufactured by Alfred Gauthier, G.m.b.H., Schwarzwald, Germany, incorporating a self-cocking shutter and a Tessar Type "Rodenstock Ysaron" copy lens. The shutter speeds are 1 second to 1/125 second and "Bulb"; "X" synchronization.

Leading rearwardly from the lens and shutter assembly, within either of the front sections 14 or 14a and terminating in an open rear face, is a chamber 38 which, in conjunction with the rear section 12, establishes a continuous passage and the aforementioned fixed distance of approximately 6 inches from the lens, namely, the 3-inch lens 32 or the 5-inch lens 32a, to the film plane at 42, the latter being established by film-positioning flange means 43. In the associated diagrams of FIGS. 6 and 7, the field area of the photographic subject is represented at 40 or 40a, respectively, and both the image plane and image there-formed are indicated at 42 and 42a, respectively. As previously intimated, the correct lens-to-subject distance of approximately 6 inches for the assembly 10 of FIG. 1 is determined by the dimensions of the accessories 16, 18, 20 and 22. The area or field of the subject to be photographed is ascertained by direct inspection. As previously indicated, no frontal accessory is illustrated for employment with the camera assembly 10a of FIG. 5, the enlarged field 40a being determined and a fixed distance of 31.3 inches between the subject and the film plane being established by the optics of the 25-inch viewfinder-rangefinder 44, releasably-attached to an adapter or clip 45.

A pivotal door or cover, 46 or 46a, having a transverse slot 48 formed therein, is located at the top of each front section 14 or 14a, respectively. A lever 50 enabling semi-automatic operation extends upwardly through the slot. It permits a rapid and simplified setting of the diaphragm aperture to three positions consistent with a given established level of illumination and the different speed characteristics of black-and-white and color film, a constant shutter speed of 1/60 second being that generally employed for either type of film during semi-automatic operation, as explained in detail below. At open position, the cover allows access to a separate diaphragm-adjusting lever integral with the pointer 130 and to the shutter-adjusting lever 51 thus making available a complete range of diaphragm and shutter settings if the operator so desires. A trigger-type shutter lease 52 permits actuation of the self-cocking shutter. A contoured handle in the form of a pistol grip 54 is releasably attached to a threaded bore 55 of the rear section 12 by inserting therein a tap-bolt 56 having a knurled knob 57. Correct rotational position of the grip is insured by positioning the pins 58 of the grip in the recesses 59. The pistol grip provides an especially convenient method of holding the camera for certain methods of photography for which the camera is intended, such as that illustrated in FIG. 40. Moreover, it may serve as a holding or steadying means in withdrawing a film unit from the camera during processing. A recessed plug 60 is adapted to receive the socket of a cable from an AC power pack for energizing the electronic flash lamp. A supply of direct current is alternatively obtainable from a battery mounted in a second handle or pistol grip 206 to be described below, which may be substituted for the pistol grip 54 and which includes a cable 214 having a socket element 216 for connection with the recessed plug 60. The protruding plug-like lugs or knobs 62 at either side of the flash unit 31 constitute fastener means adapted to engage mating socket-like fastener apertures or receptacles 64 of each adapter element 66 associated with the accessories. The protuberances 67 contribute to the proper mounting of each accessory on a front section of the camera by providing a firm and accurate seating of the accessory thereupon.

The rear section 12 includes a first chamber or compartment 68 suitable for receiving and mounting for photographic exposure a film pack comprising a plurality of film units, e.g., eight such units. These film units or assemblies are of a type adapted to produce completed prints through a diffusion transfer process when photographically exposed, subjected to compression to release a contained processing liquid, and withdrawn from the compartment 68 through a slot 69 (FIGS. 15 and 21) located on the end of the latter opposite to that at which the strap 15 is mounted. Film packs related to the type contemplated and capable of producing prints of approximately 3¼ x 4¼ inches in black-and-white or color are now commercially available and are described in U.S. Patent 3,080,805. The rear section 12 contains mechanism, illustrated by the pressure rolls 71 of FIG. 15, for applying the aforesaid compression to each film assembly to effect its processing following a photographic exposure, a generally similar mechanism being also described in U.S. Patent 3,080,805. A passage or second chamber 70, terminating in the aforementioned open front or face, leads forwardly from the image plane 42 at which each film unit is successively positioned for exposure.

Figure 35:
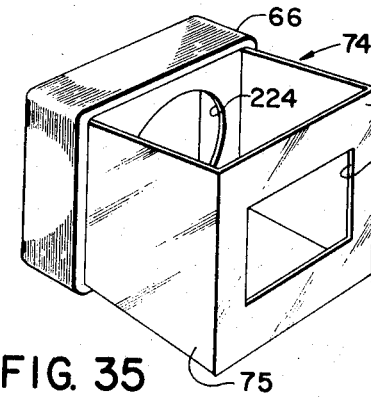
FIG. 35 is a diagrammatic perspective view of the spacing and support accessory 74 of FIG. 8.

In FIG. 8 there is shown an optical augmented assembly 10b of the subject camera for providing a 2× magnification of the photographic subject. It includes the previously-described rear section 12 and the front section 14, employed in the assembly of FIGURE 1 which includes the 3-inch lens. However, interposed between the sections 12 and 14 is an intermediate housing or section 72 which provides an overall lens-to-film plane distance of approximately 9 inches and which may be considered as a ratio multiplier. This augmented distance, in conjunction with the 3-inch lens of front section 14 and a reduced lens-to-object distance of about 4½ inches, provided by the shorter length of the occessories 74, 76, 78 and 80, produces the desired 2× magnification. It will be noted that the pistol grip 54 has been separated from engagement with the rear section 12, and is at a position for attachment to the intermediate section 72 by means of the tap-bolt 56 and threaded aperture 55. Repositioning of the pistol grip 54 serves two functions. It maintains the proper balance or weight distribution of the camera for most efficient operation. It maintains the correct spacing between the grip and the shutter-release trigger 52 to enable identical operation of the latter for either the short assembly of FIGS. 1 and 5 or the long assembly of FIGS. 8 and 13. The accessory 74, shown more fully in FIG. 35, includes, in addition to the adapter 66, the forwardly-extending side elements 75 and a frontal transverse element 77 having an aperture 77a defining the field of the subject to be photographed. It is a general-purpose spacer providing the aforesaid distance of approximately 4½ inches from lens to subject and constitutes a complete support when the camera is positioned vertically on a level horizontal surface and a partial support when the camera is held horizontally against a vertical surface. The accessories 76, 78 and 80 serve footprint, fingerprint, and intra-oral dental photographic functions, respectively.

The intermediate section or housing 72 includes the slidable latch member 28, the actuating knob 29, and the door or baffle element 30, all similar to components previously described relative to the rear section. The section 72 is a hollow, rectangular element, open at both ends, providing an extended passage between the front and rear sections and, accordingly, an increase in distance between the lens and film plane essential to the 2× magnification. The optical operation of the camera assembly 10b, assuming its components to be joined together, is illustrated in the diagram of FIG. 12. The less-distant subject area, of reduced dimensions, is designated 40b and the more-distant image plane and image, there-formed, is located at 42b.

An assembly of the camera components 10c providing an 0.85:1 ratio of image-to-subject area is shown in FIG. 13. It comprises the rear section 12, the front section 14a embodying the 5-inch lens, the intermediate section 72, above described, and the spacer accessory 82 releasably attached to the front section 14a in the manner of the aforementioned accessories. The pistol grip 54 is attached to the intermediate section. The spacer element 82, structurally similar to the element 16 but approximately 8 inches in length, enables a somewhat larger ratio of image-to-subject area than the ¼:1 ratio, previously described. Furthermore, it serves as a stable mounting or positioning means, in a manner similar to that of the accessories 16 and 74. The assembly of FIG. 13 provides the 0.85:1 ratio of image-to-subject through the instrumentality of a lens-to-film plane distance of approximately 9 inches, the 5-inch lens of its front section 14a and the aforesaid distance of 8 inches from lens-to-subject area. The optical performance of the assembly of FIG. 13 is shown, diagrammatically, in FIG. 14, wherein the field area of the subject is designated 40c, the 5-inch lens assembly 32a, and the image plane and image 42c.

It will be understood from the foregoing description and figures that in the camera assemblies of FIGS. 1 and 5, as provided by the two-sectional structure thereof, the distances from lens-to-image plane are substantially identical, although very slightly greater in that of FIG. 5, because of a more forward location of a principal plane or point of the 5-inch lens assembly. Similarly, in the assemblies of FIGS. 8 and 13, as provided by the three-sectional camera structure, the distances from lens-to-image plane are also substantially identical excepting for the slightly greater length for the 5-inch lens assembly but, obviously, greater than those of FIGS. 1 and 5. The aforementioned small differences of distance due to differences of a principal plane in the optical system are so slight, e.g., ¼ inch or less, as not to be apparent in the diagrams of FIGS. 6, 7, 12 and 14. In resumé, it will be apparent that these distances are achieved in conjunction with two interchangeable front sections mounting lens assemblies of 3-inch and 5-inch focal length, and with interchangeable accessories determining the three lens-to-subject distances provided by the camera assemblies of FIGS. 1, 8 and 13, with accessories, and indicated in FIGS. 6, 12 and 14. The lens-to-subject distance of FIG. 7 is determined by the rangefinder 44, the optics of which are adjusted to this distance. In every instance, it will be noted that the images at the film plane are dimensionally similar, that is, they completely fill the frame of exposed film. The image-to-subject-area ratio or magnification is chosen in accordance with the area and visible detail of the subject material which it is desired to reproduce. In each of the described camera structures an optical axis of the lens assembly may appropriately be regarded as extending centrally and longitudinally of the assembled sections, and as being projected forwardly to the object being photographed.

Referring to FIGS. 15 through 21, a cooperating latch and baffle mechanism, which releasably holds the several camera sections together and operates the protective door or baffle 30, is shown in detail and at successive operational positions. As previously intimated, the baffle 30 is at open position only when the camera sections 12, 14, 14a and 72 are in assembled relation. The shutter then controls the film exposure. The baffle 30 is automatically brought to closed position, firmly seated against the frame 83, whenever the camera sections are disassembled. In this manner a photo-sensitive film, positioned at the image plane 42, is always protected against an inadvertent exposure when the sections are separated in the course of preparing to take a picture requiring a different ratio or magnification.

In FIG. 15, the latch and baffle mechanism is shown mounted in frontal portions of a rear housing section 12, it being understood, as indicated in FIGS. 8 and 13, that an identical mechanism is also incorporated in the intermediate section 72. The two latch members 26, fixed to and projecting rearwardly from a front or an intermediate section 14 or 72, as the case may be, which is about to be joined to the rear section 12, are shown in the process of entering apertures 84 formed in the frontal framing plate assembly 86 of the rear section. The baffle 30, illustrated at closed position, is rotatably mounted on the shaft 90 by the unitary projecting perforated lugs or appendages 88, the shaft 90, in turn, being rotatably mounted in bearing means identified with the side walls 92 of the rear section. One end of shaft 90 extends through the far side wall 92. The actuating knob 29 is fixedly attached to the extremity of the shaft. A fixed pin 94 extends outwardly from the side wall 92 and a circular slot 96 describing an arc of slightly more than 180° is formed in the inner surface of knob 29. When the knob is turned, the ends of the slot 96 are ultimately brought into contact with the pin 94 and thus limit the rotation of the knob in either direction. A curved flat spring 98, mounted within the slot and terminating in outwardly-bent extremities, short of the ends of the latter, provides, with the pin 94, detent means such that a recognizable "click" occurs at the extremes of clockwise or counterclockwise rotation of the knob, the knob being releasably held between the bent ends of the spring and slot at these limits of rotation.

Each of the lugs 88, serving as bearing means for movement of the baffle 30, includes a cut-away section 88a. Two pins 100 are fixed to and extend radially outwardly from the shaft 90. The pins are free to undergo an unimpeded rotation of approximately 90° by reason of the cut-away portions 88a of the lugs 88. After being rotated into contact with the edge of each cut-away portion 88a through a 90° turning of the shaft 90 in response to rotation of knob 29, further rotation of shaft 90 and pins 100 causes pivotal movement of the lugs and the baffle 30, integral therewith. The door 30 is biased toward the closed position, illustrated, by the torsion spring 102. A cam 104, having a surface or segment of major radius extending through approximately 90° or one-quarter of its periphery, with a pin 106 projecting from one end of the aforesaid surface, is fixed to the shaft 90 adjacent to each of its ends and rotates therewith.

One latch mechanism only, located at one side of the rear section 12, is shown in the drawings, it being understood that an identical mechanism is located at the opposite side, underlying the framing plate 86 adjacent to the aperture 84. The latch member 28 is slidably mounted for linear movement in a channel 108. A hooked projection 110 of the latch releasably engages the pin 106 of cam 104. A U-shaped flat spring 112 is fastened to an end of each latch member 28 and constitutes a resilient cam-follower, subject to be contacted by cam 104. Each latch element 28 includes a tapered extremity 114, adapted to be contacted by the cross-bar 26a of the complementary clevis-type latch element 26 of the section which is to be joined. The latch element 28 also includes the undercut area or slot 116.

Completing the latch mechanism, is a supplemental latching means or detent assembly comprising a movable, plunger-type pin 118, biased radially outwardly from the shaft 90 by the compression spring 120, and the aperture or perforation 122, formed in the lower member of the frontal framing plate assembly 86 and adapted to receive the pin 118 when brought into alignment therewith. The mechanism is shown in greater detail in FIG. 16. A fixed pin 124 projecting from the rear face of the section to be joined, e.g., the front section 14, is caused to be inserted in the aperture 122 from the opposite side when the two sections are completely joined together thus forcing the pin 118 out of the aperture 122. When the spring-biased pin 118 is in the aperture 122, the shaft 90 is held against rotation. When the pin 118 is removed from the aperture, the shaft 90 is free to rotate.

In FIG. 17, the cross-bar 26a of the latch element 26 is just commencing contact with a first inclined or angular surface of the tapered extremity 114 of the latch element 28.

Figure 18:
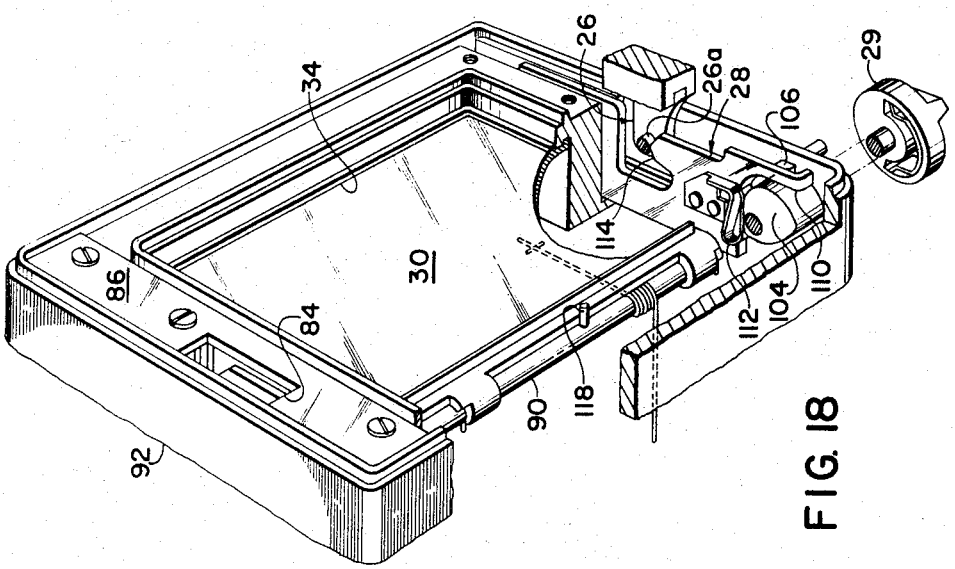

In FIG. 18, the cross-bar 26a is in contact with the tip of the tapered extremity 114 and has forced the latch 28 downwardly, as permitted by the compressibility of the spring-like cam-follower 112. It is to be noted that the hooked latch member 110 has been withdrawn from the cam pin 106.

Figure 19:
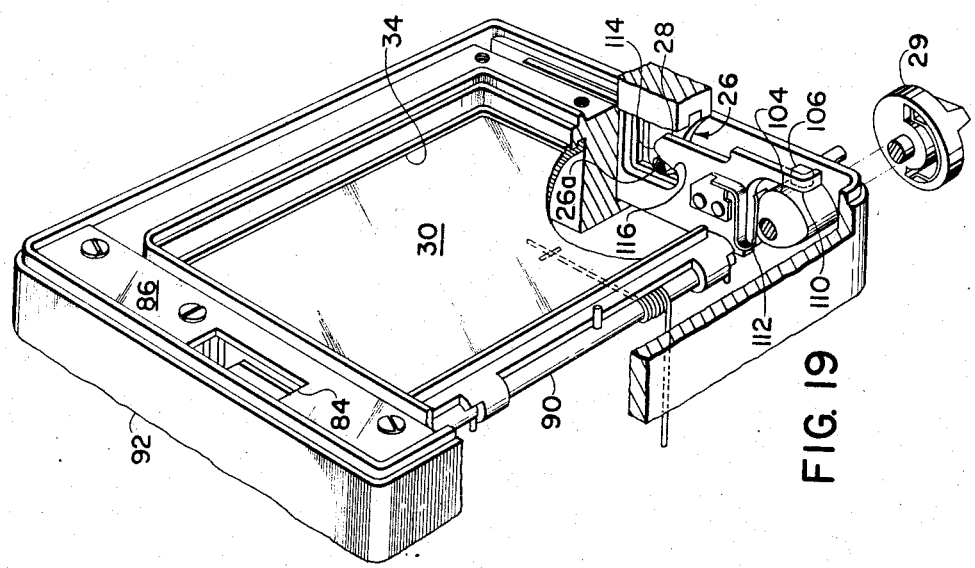

As shown in FIG. 19, a further insertion of the latch members 26 has brought the cross-bar 26a to a location in contact with the second, oppositely-angled surface of the tapered extremity 114 of the latch element 28 and is in readiness to enter the notch or slot 116. Accordingly, the latch 28 has been caused to slide upwardly, responsive to the bias of the compressed cam follower 112. The two camera sections are now somewhat loosely held together. The hooked latch member 110 has been returned to contact with the cam pin 106. At this juncture the fixed pin 124 of a front or intermediate section, as the case may be, has forced the movable pin 118 out of the aperture 122, thus permitting the shaft 90 to undergo rotation.

Figure 20:
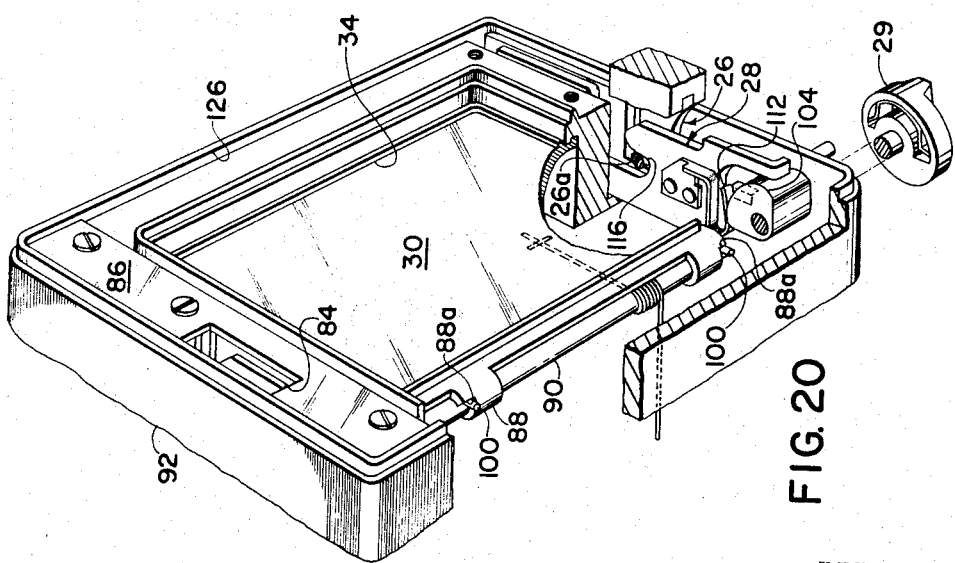

In FIG. 20, the knob 29 and shaft 90 have been rotated 90° in a clockwise direction, assuming one is facing the knob 29. The cam 104, including the cam pin 106, has, of course, been similarly rotated, thus bringing its surface of major radius into contact with the spring-like cam-follower 112. The latter is again compressed and to a degree such that it forces the latch element 28 to move upwardly. Accordingly, the cross-bar 26a of the latch 26 is brought to a location well within the notch 116 and the two camera sections are completely joined, the flanged edges 125 and 126 of the respective sections mating to provide a light-tight seal. The pins 100 have, meanwhile, been so rotated as to contact the edges of the cut-out lug portions 88a and are in readiness to cause a pivotal opening movement of the door or baffle 30.

FIG. 21 illustrates the position of elements of the latch and baffle mechanism existing when the limit of clockwise rotation of the knob 29, namely, a total rotation of slightly more than 180° has been reached, as determined by contact of the end of the slot 96 and the "click" spring 98 with the pin 94. The baffle 30 has been swung to open position, through continued rotation of the pins 100, bearing against the cut-away edges 88a of the door lugs. Accordingly, a clear passage is provided to the film plane 42 and the section 12 is in readiness for performing a photographic exposure. During this operation, the torsion spring 102 has been increasingly tensioned. Cam 104 has been permitted to rotate freely, in contact with the resilient spring 112, the latter having a predetermined resiliency maintaining the bias which previously moved the latch element 28 to holding relation with respect to the latch element 26.

Return of the baffle 30 to closed position, followed immediately by release of the latching mechanism, is accomplished by turning the knob 29 180° in an opposite or counterclockwise direction to the limit permitted by the slot 96 and pin 94. The baffle 30 is thus returned, so as to be firmly seated against the frame 83 under the bias of torsion spring 102 and as allowed by the rotation of the pins 100 to their original position. The pin 106, projecting from cam 104, is rotated to engagement with the hooked extremity 110 of latch 28. The latter is carried downwardly by the pin 106 causing the withdrawal of the overlying tapered extremity 114 of the latch from the cross-bar 26a. The camera section identified with the latches 26 is thereby released from joined relation with the rear section 12. Accompanying the foregoing operations leading to separation of two camera sections, the pin 118 of shaft 90 has been returned to alignment with the aperture 122 of framing plate 86 and, under bias of the spring 120, has entered this aperture, the latter, of course, being of slightly greater diameter than the pin. Accordingly, the baffle 30 is locked at closed position and cannot be opened when either the back section 12 or an intermediate section 72 has been separated from another camera section, except by the insertion of a probe in the aperture 122 or by the reattachment of a camera section. Thus, any danger of the knob 29 of a disassembled rear section or of an intermediate section, combined therewith, being accidently turned is completely avoided.

In FIGS. 22 and 23, the front camera section 14 incorporating the 3-inch lens, is shown with the cover 46, pivotally mounted on its upper surface, at closed and open positions, respectively. At closed position of the cover, the shutter speed is fixed at 1/60 second because the flange 128, extending inwardly from the cover, prevents its being closed unless the shutter-speed lever 51 has been advanced to the 1/60 second index mark, thereby clearing the flange. If the lever 51 were at a slower shutter-speed setting, the flange 128 would contact the lever and the cover could not be closed.

Again referring to the closed position of the cover 46, three functional settings of the diaphragm-adjusting lever 50 are shown applying to what may be considered an automatic or semi-automatic operation. This type of operation is adapted to practically every use to which the camera is primarily intended to be applied. At both the "Black-and-White" and "S" positions the diaphragm setting is f/45. At the "Color" position it is f/18. The "S" index mark is also for color film but, due to the f/45 aperture, provides a greater depth of field than the larger f/18 aperture at the "Color" position. As above stated, the shutter speed is held constant for all three positions of the lever 50, namely, at 1/60 second.

With the cover open, as in FIG. 23, a range of shutter settings, from "Time" to 1/125 second, and a range of diaphragm adjustments, from f/4.5 to f/45 are possible through manual adjustment of the levers 51 and 50, the pointer 130 moving in response to movement of lever 50 and designating the selected f/value. A connector or socket 132 is provided for cable release operation. Manual operation with the cover open is intended to be undertaken only when the operator desires to make an extreme or intermediate setting of diaphragm or shutter. Pointer 130 may be moved directly for the purpose.

FIGS. 24 and 25 illustrate the closed and open positions of the cover 46a of the front section 14a which includes the 5-inch lens. The "Black-and-White," "S" and "Color" index marks, visible at closed position of the cover, provide f/45, f/16 and f/8 diaphragm settings, respectively. The shutter speed is maintained at 1/60 second throughout by means of the flange 128a. With the cover open, a diaphragm setting range of f/4.7 to f/45 and shutter speeds of 1/125 second to "Time" are available. The control means of both FIGS. 22 and 24 involve settings which have been predetermined with respect to given levels of illumination provided by the electronic flash unit 31.

FIGS. 26 through 29 illustrate schematically, from the rear, exposure mechanism of the camera front section 14 which incorporates the 3-inch lens. The assembly includes diaphragm aperture adjusting means actuated by the lever 50 cooperating with a neutral density filter 134. The filter, having a density, for example, of approximately .7 (or a value of approximately 2½f stops), is mounted in an arm member 135 which is fixed to the forward end of a pivotal shaft 136 extending at 90° relative to said arm member, the filter thereby being pivotally movable to a position either aligned with or to one side of the diaphragm aperture. The lever 50 is integral with a rotatably mounted master control ring 137. The lens tube or opening is represented at 138, the iris diaphragm at 140, and the diaphragm aperture at 142. A generally arcuate slot 144, terminating in a more abruptly curved portion 144a, is formed in the ring 137.

The shaft 136 is rotatably mounted in a plate or frame element 146 supporting the entire assembly. A shorter arm 148, serving in a driving capacity, is also fixed, at one end, to a rearwardly located portion of the shaft 136. Bearing means 150, in the form of a fixed pin, a modified roller bearing or the like, is mounted at the other end of arm 148 so as to project forwardly, through a generally rectangular aperture 152, formed in the support frame 146, and thence into the slot 144.

A second slot 154 is formed in the rotatable control ring 137. An appendage 156 extends outwardly at an acute angle from the periphery of ring 137. A rotatably-mounted ring element 158, for directly actuating the leaves of the iris diaphragm 140 in a conventional manner and thereby varying its aperture 142, is located immediately forwardly of ring 137, that is, behind the latter as viewed through the slot 154 in FIGS. 26–29. A pin 160, fixed to the ring element 158 or to an appendage thereof, projects rearwardly from the latter, toward the viewer as shown in FIGS. 26–28, through the slot 154. An extension spring 162 interconnects the lug 156 and the pin 160. The rings 137 and 158 are mounted for rotation by suitable bearing means (not shown) associated with the frame 146.

The position of elements in FIG. 26 is that which would exist when the lever 50, as viewed in FIG. 22, is at the "Black-and-White" index mark. FIG. 28 shows the position of the exposure mechanism with the lever 50 at the "S" index mark. FIG. 29 illustrates the location of the various elements with the lever 50 at the "Color" index mark. FIG. 27 represents an intermediate or transitional condition of the filter element 134 and its actuating mechanism during movement of the lever 50 from the position of FIG. 26 to that of FIG. 28.

Movement of the lever 50 in the clockwise direction indicated in FIGS. 26–29 produces the following operations. The pin 150 is carried by the more steeply curved slot portion 144a and initiates a counterclockwise rotation of the arm 148 and integral shaft 136. The arm 135, attached to shaft 136 and carrying the filter 134, is thereby also caused to rotate in a counterclockwise direction and, as shown in FIGS. 28 and 29, is eventually moved entirely beyond or to-one-side of its previous location in alignment with the lens aperture shown in FIG. 26. During this operation, the pin 160 is maintained stationary under the bias applied by spring 162, as illustrated in FIGS. 26–28, the diaphragm aperture 142 thus being held at a constant diameter. This condition continues until an edge of the slot 154 contacts the pin 160, thereby causing a clockwise rotation of the pin and of the integral diaphragm actuating ring 158 to produce the larger diaphragm aperture of FIG. 29. The reserve length of slot 144 permits the lever 50 to be freely rotated additionally in a clockwise direction, to make available the wider range of stop values illustrated when the cover 46 is open, as indicated in FIG. 23. The lever 50 is positioned positively at the three index marks of FIG. 22 by detent means composed of the resilient arm element 164, attached to the support frame 146, and the three notches 166, formed in the periphery of the ring 137, into which the formed end 164a of the arm is adapted to enter.

During the foregoing operations, it is to be noted that when the pin 150 enters the major portion of slot 144 which is of a constant radius no further rotation of the arms 148 and 135 occurs, thus defining and limiting the point of extreme removal of the filter 134 from its position of superimposition with the lens aperture. The resiliency of the spring 162 is such that it holds the diaphragm actuating ring 158 at its limit of counterclockwise rotation, namely, that producing the $f/45$ value, throughout the operation of FIGS. 26–28, even though the tension of the spring is gradually diminished. In FIG. 29, its tension is approaching a functional minimum but is still sufficient to maintain the pin 160 in firm contact with the edge of the slot 154, at this stage or during any subsequent movement of the lever 50 and of the slot 154 in a clockwise direction. The diaphragm adjusting mechanism associated with the camera front section 14a which includes the 5-inch lens is generally similar to that above-described relative to the 3-inch lens, the variable-density filter being omitted relative to the $f$/values associated with the three index marks of FIG. 24.

A modification of the semi-automatic control means of FIGS. 22 and 24 involves a two-position setting of the lever 50 instead of the three positions shown. This constitutes a preferred change in the interest of greater simplification. The "Black-and-White" and "Color" index marks are retained, the "S" index being omitted. Relative to the assembly of FIG. 22 associated with the 3-inch lens, a "Black-and-White" setting of lever 50 produces a diaphragm aperture at $f/45$. The density of the variable density filter 134 employed therewith (FIG. 26) is modified to a 4-stop value. The "Color" setting involves a diaphragm value at $f/32$ with the variable-density filter 134 removed as in FIG. 29. With respect to the showing of FIG. 24 identified with the 5-inch lens, the "Black-and-White" setting of lever 50 produces a diaphragm value at $f/45$, the variable-density filter having a stop value of 1.0. The "Color" setting assumes a diaphragm aperture at $f/11$, the variable-density filter being removed from alignment therewith. The foregoing modification is accompanied by a predetermined increase in the light-level provided by the electronic flash unit 31.

The shutter actuating mechanism, illustrated at the cocked position in FIG. 30, comprises the shutter actuating release lever 168 pivotally mounted at 170, the integral trigger 52 and shaft 172, the latter being pivotally mounted in the bearing means 174 attached to the rear wall of the camera front section 14 or 14a, the arm 176 fixed to an end of the shaft 172, and the link 178 interconnecting the lever 170 and arm 176. By pressing the trigger 52, the shaft 172 and arm 176 are pivoted in a clockwise direction, as viewed in FIG. 30, and the lever 168 is rotated in a counterclockwise direction, thus tripping or releasing the shutter by a known release mechanism (not shown). Upon release of the trigger the shutter and associated actuating elements, above-described, are automatically returned to the cocked position through a conventional self-cocking mechanism (not shown).

Figure 31:
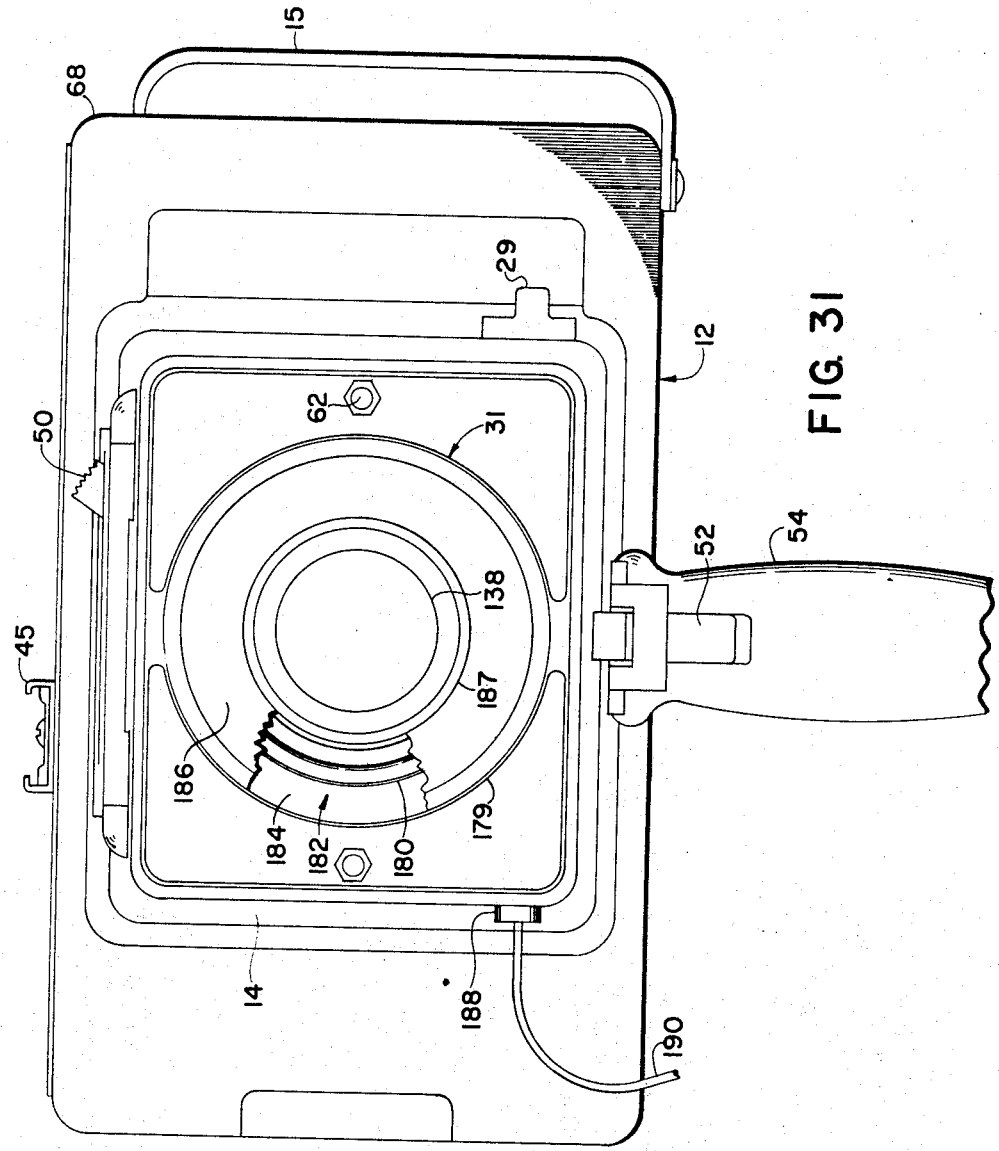
FIG. 31 is a diagrammatic front view of the camera illustrating a built-in electronic flash unit.

The integral electronic flash unit or ring light 31 is shown in the front view of the camera in FIG. 31. The unit comprises a circular metallic casing element 179, and a generally conventional ring-type, gaseous flash tube 180 mounted in an annular compartment 182 formed within the element 179. At the rear of the compartment is a reflector 184, and, across its front, is an annular light-transmitting plate 186. The aforesaid elements surround a circular forwardly-extending flange 187 defining an aperture leading to the lens aperture 138. A socket 188 and cable 190, connected to the recessed plug 60, provide a suitable electrical input from a power pack unit to the flash tube in conjunction with the shutter contacts ("X" synchronization) and the output therefrom. Assuming the spacing elements 16 and 74 to include forwardly-extending metallic plates which are highly polished on their inner surfaces, the latter may be regarded as serving in a light-gathering or light-propagating capacity in conjunction with the flash unit.

Figure 32:
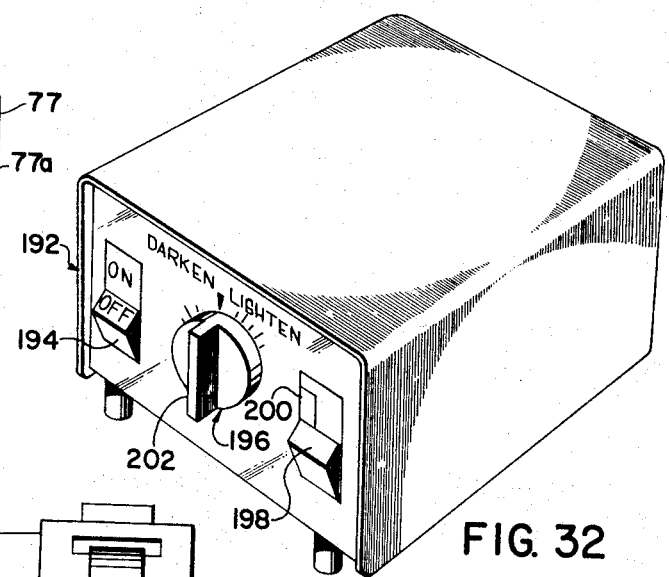
FIG. 32 is a diagrammatic perspective view of an AC power pack for electronic flash unit.

An alternating-current power pack unit 192, operating on 115-volt AC, is shown in FIG. 32. The unit functions by building up a high potential direct current charge on capacitor means thereof and applying the potential to the electrodes of the flash tube; then applying a high voltage pulse to the tube through the intermediary of the shutter contacts to trigger discharge of the capacitor means and produce the flash. The unit includes an on-off switch 194, a light-level control means 196 and a test switch 198 including a pilot light 200. The control 196 includes a rotatable knob 202 with movable index mark, and fixed "Lighten" and "Darken" indicia partially surrounding it. The knob-shaft is connected with a variable resistor (not shown) of a type which provides a continuously adjustable control of the charge on capacitor means (not shown) of the unit, thus varying the intensity of the flash. Input and output connector means of the power pack are provided at the rear of the unit.

Figure 33:
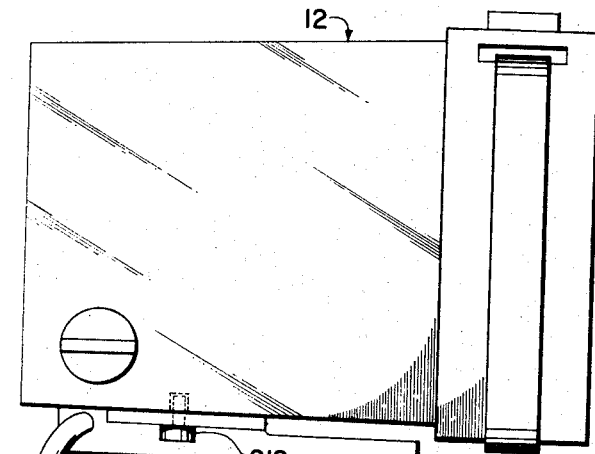
FIG. 33 is a side view of a DC power pack and light-level control adapter attached to a section of the camera.

An alternate self-contained DC power pack unit 204, incorporated with a separable pistol grip 206, is illustrated in FIG. 33. The unit constitutes a source of flashgun energization where an AC supply is not available and includes a light-level control element 208, a bayonet connector 210 attaching the pistol grip to the control element 208 and including electrical contacts engaging contacts of the latter, two thumb-screw type threaded connectors 212 for attaching the element 208 to threaded apertures in the underside of the camera section, and a cable 214 with socket element 216 leading to the recessed plug 60. An on-off switch 218 is provided. The unit accommodates two 1.5-volt batteries, mounted in the pistol grip 206. The control element 208, shown in greater detail in FIG. 34, comprises a lever 220, movable across a scale of light-value indicia, and attached to a variable-step resistor. Input to the control element from the batteries is through the aforesaid contact means provided within the bayonet connector 210. Output to the "X" synchronization contacts of the shutter and the electronic flash tube is provided by the cable 214 and socket 216.

Figure 34:
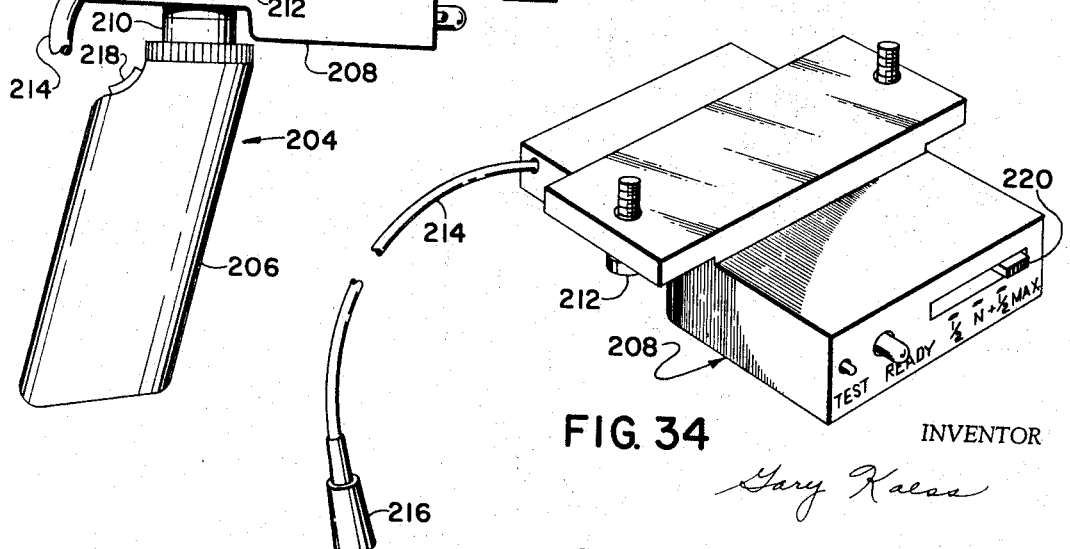
FIG. 34 is a diagrammatic perspective view of the light-level control adapter of FIG. 33.
Figure 41:
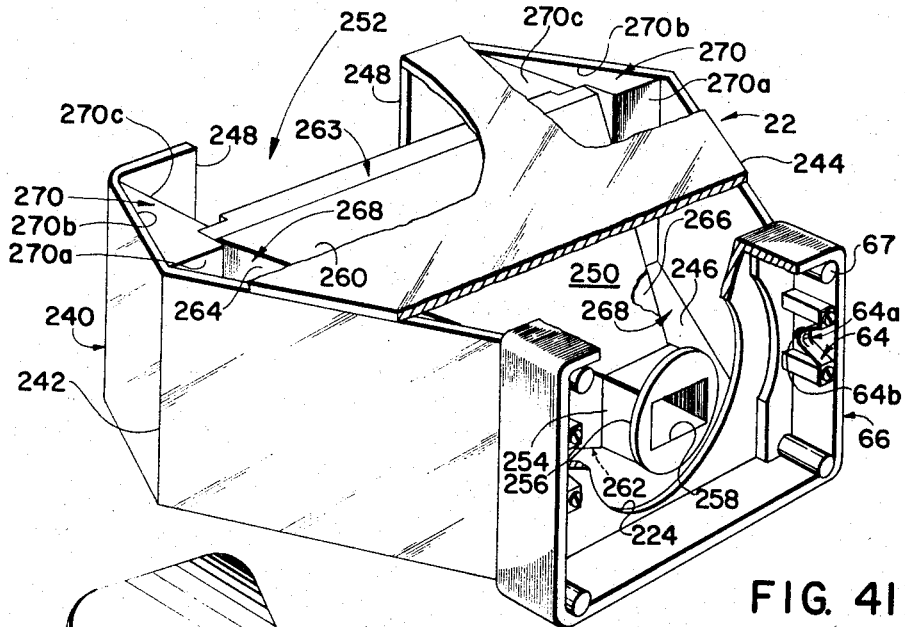
FIG. 41 is a diagrammatic perspective view of an attachment for use in the photographing of fingerprints or other subject material having small surface projections and depressions.
Figure 37:
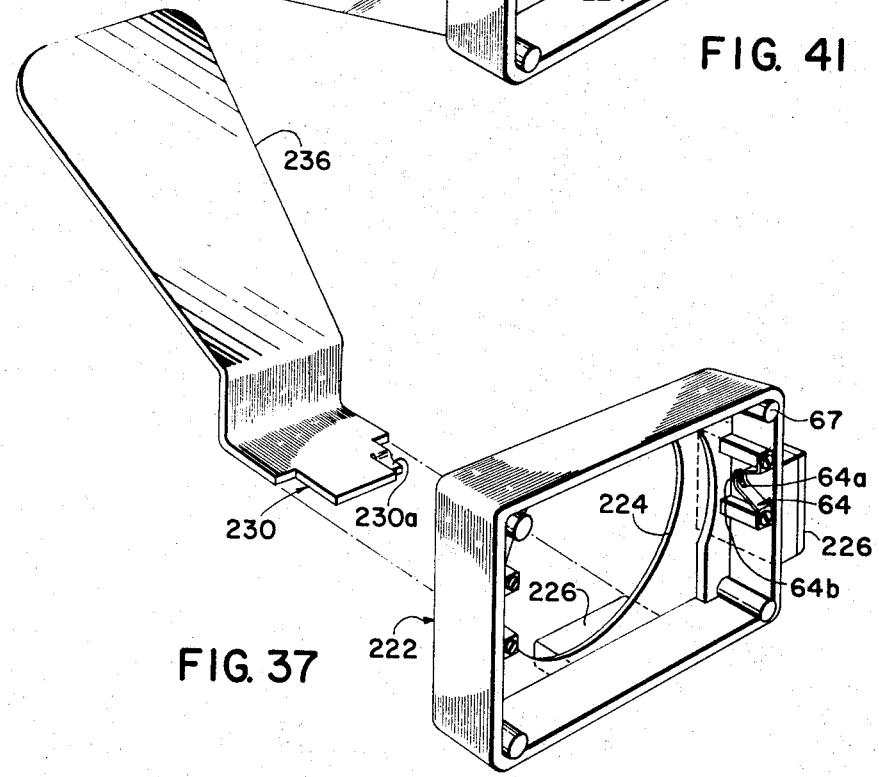

The light-level control means for the electronic flash unit 31, illustrated in FIGS. 32–34, enable an efficient control of exposure without any adjustment of shutter speed or diaphragm aperture during semi-automatic operation, that is, with the cover 46 closed and the lever 50 at the "Black-&-White," "S" or "Color" index marks, or at either the "Black-&-White" or "Color" index marks of the modified two-position control means associated with the lever 50, above described. In general, for obtaining adequate print densities at the "Black-&-White" and "Color" settings, the control knob 202 of the AC power pack (or the lever 220 of the DC unit) may be set at the median or normal position. At the "S" (color special) setting, if included, a preferred light-level may be at the "Maximum" or extreme "Lighten" index mark. As previously intimated, if desired, a more complete range of light-level indices may be employed in conjunction with manual shutter and diaphragm settings, obtainable when the cover 46 is at open position. The self-processing feature of the camera, as provided by processing means of the rear section 68, makes it almost immediately possible to check the print and ascertain the density and color "result" of a given light-level setting. It is thus possible to make a rapid correction if this proves to be necessary. Inasmuch as the camera is particularly adapted to use in conjunction with surgery, the rapid obtainment of timely finished prints of an area during the course of an operation is of inestimable value.

FIGS. 36 through 39 illustrate a special adapter element 222 and a series of accessories, of various configurations and formed of a highly-polished metal such as a stainless steel, releasably attachable thereto, for use in dental photography. The adapter 222 is a metallic frame-like component of a generally rectangular shape and of dimensions providing, when it is joined to the front face of the camera front section 14 or 14a, an apparent forward extension or part of the front section itself. The adapter 222, similar to the adapter 66, comprises the pair of fastener elements 64, each fastener including a central perforation 64a and, adjacent to this perforation, the resilient finger elements 64b, adapted, in conjunction with the bosses or protuberances 67, to firmly but releasably engage the protruding lugs 62 of the camera front section and effect attachment of the adapter to the latter. The adapter element 222 also includes a large circular central aperture 224 for accepting the ring light 31 and a pair of socket members 226, each having an elongated, narrow, notched slot 228 for receiving a generally flat keyed insert or tongue 230 of one of the dental accessories. The notch 228a of the slot only accepts the key 230a of the insert thus insuring that each accessory is properly attached to the adapter.

The intra-oral dental accessories 232, 234 and 236, comprising reflective surfaces, are adapted to provide anterior views of dentition, namely, lateral buccal, lateral lingual, and palatal views, respectively. Other similarly attachable accessories, not shown, include those providing maxillary and mandibular occlusal views. The accessory 238 of FIG. 39 is intended for extra-oral usage to provide a given distance between the camera lens and subject as well as a steadying support, the recessed extremity 238a being positioned against the chin of the photographic subject as shown in FIG. 40.

The basic spacer accessories 16 and 74 and the foot-print accessory 76, the latter being indicated merely in outline and the subject of the copending U.S. patent application, Ser. No. 380,299, filed July 6, 1964, are permanently attached to their adapter elements 66. Whether an accessory is releasably or permanently attached to an adapter is largely a matter of its usage, e.g., its requirement for and suitability to cleaning procedures, its weight, or its need for stability in a supporting function. In the instance of dental or medical accessories, a principal advantage is that of being able to remove the accessory, rapidly, from the adapter for ease of cleaning or sterilization.

The fingerprint accessory unit 22 (or 78, the distinction being essentially one of length, only) includes the permanently joined adapter 66, for attachment to a camera front section. The aforesaid unit, preferably constructed of a light-weight sheet metal such as aluminum or the like, comprises an outer housing 240 including the forwardly-flared side, upper and lower, and the partial-front transverse wall members, 242, 244, 246 and 248, respectively, and a generally conical or flared inner housing 250 terminating in an open front. The spacing 252 between the two front-wall sections 248 of the outer housing defines the area or field of the subject which is to be photographed. The inner housing 250 includes at its rear extremity a rectangular rearwardly-extending projection forming a short passage 254, the latter terminating in a circular flat cap 256 which fits snugly within the flange 187 of the camera front section. An aperture 258, e.g., a rectangular opening, is formed in the center of the cap 256 and is thereby located centrally of, but spaced from, the edges of the circular aperture 224 of the adapter. Accordingly, the opening 258 is aligned with the lens, shutter and diaphragm assembly of the camera front section when the fingerprint unit 22 is joined therewith. The front extremities of the flared upper and lower walls 260 and 262 of the inner housing terminate at 263 in abutting relation with the upper and lower walls 244 and 246 of the outer housing. The flared side walls 264 and 266 of the inner housing are spaced from and differentially angularly disposed relative to the adjoining side wall of the outer housing, the inner housing walls being more steeply angled with respect to a plane including the rear extremities of the adapter 66. The inner housing terminates, forwardly, at a plane which is predeterminedly spaced, rearwardly, from the front wall sections 248 of the outer housing.

A light-transmitting passage 268 extends forwardly between the respective outer- and inner-housing side walls at each side of the unit. Each passage terminates at its forward extremity in a prism 270 such, for example, as a right prism, having an entrance surface 270a, a reflecting surface 270b, and an exit surface 270c. The prism length extends vertically between the inner surfaces of the upper and lower walls of the outer housing. The passages 268 serve to transmit light rays emitted by the left- and right-hand segments of the electronic flash tube 180. The rays enter the prism surfaces 270a, are reflected at 270b and leave the surfaces 270c so as to be incident upon the plane of the photographic subject, against which the front wall sections 248 are placed, at an acute angle. Assuming that the fingerprint which is to be photographed is formed on a smooth surface which would reflect rays, normal or substantially normal thereto, to the lens as surface "glare" and, accordingly, would impair the quality of the photographic image, the angularly incident light rays produced by the unit 22 are not thus reflected from the surface to the lens and provide an image which is clearly defined and possesses the desired contrast. It will be understood that the photographic reproduction is made, directly, by the camera assembly to which the unit 22 is attached, the image-forming light rays from the subject being transmitted by the inner housing 250 to the lens assembly. As stated above, the unit is also adapted to the photographing of other subject matter wherein it is essential to eliminate surface glare from the material bearing the subject matter to be photographically recorded.

With, as is contemplated, the addition of a third front section for direct attachment to the rear section 12, incorporating a lens-adjusting mechanism or extensible lens board enabling the photographing of objects at continuously varying distances from a given near point to infinity, and, for example, a coupled viewfinder-rangefinder, the camera has an alternative use as a general-purpose camera, thus widening its scope. Suitable shutter speeds and f/ values are to be understood as incorporated with such a modification, the semi-automatic and manual control features shown in FIGS. 22–25 being modified, as necessary. The disassembly or knock-down features of the camera, that is, of the various housing sections and accessories, also contribute to its portability. Thus each component may readily be fitted into a sectioned carrying case of moderate dimensions.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A knock-down camera embodying a plurality of interchangeable components for photographing, with extreme accuracy of focus and exposure, a wide variety of objects at given short-range distances in minute detail at a predetermined magnification or other given dimensional ratio of like image and object portions, comprising a rear housing section adapted to carry a photosensitive film material and position it for exposure at a focal plane, a plurality of individually selectable front housing sections each incorporating a lens of relatively different focal length, exposure mechanism and actuating means therefor incorporated with each selected one of said front sections, a plurality of individually selectable means releasably-attachable to a given one of said sections for establishing a given spacing between said lens and said object to be photographed, and a plurality of manually-operable latching means incorporated with and predeterminedly distributed between said sections for assembly, disassembly and interchange thereof, comprising a plurality of mutually-engageable fixed and movable latch members, the length of an optical axis extending within said rear section and said selected front section, along which image-producing light rays are transmitted, when taken with the focal characteristics of the lens of a selected front section and the distance provided by said spacing means, determining said given magnification and other dimensional ratio of image and object portions, said exposure mechanism comprising a pistol grip releasably-attached to said rear housing section and a shutter-release element in the form of a trigger which is linked to shutter-release mechanism and pivotally mounted on each of said selectable front sections at a location having a given adjacency to said pistol grip of said rear section when said rear and front sections are brought to mutually assembled relation.

2. A knock-down camera embodying a plurality of interchangeable components for photographing, with extreme accuracy of focus and exposure, a wide variety of objects at given short-range distances in minute detail at a predetermined magnification or other given dimensional ratio of like image and object portions, comprising a rear housing section adapted to carry a photosensitive film material and position it for exposure at a focal plane, a plurality of individually selectable front housing sections each incorporating a lens of relatively different focal length, exposure mechanism and actuating means therefor incorporated with each selected one of said front sections, a plurality of individually selectable means releasably-attachable to a given one of said sections for establishing a given spacing between said lens and said object to be photographed, and a plurality of manually-operable latching means incorporated with and predeterminedly distributed between said sections for assembly, disassembly and interchange thereof, comprising a plurality of mutually-engageable fixed and movable latch members, the length of an optical axis extending within said rear section and said selected front section, along which image-producing light rays are transmitted, when taken with the focal characteristics of the lens of a selected front section and the distance provided by said spacing means, determining said given magnification and other dimensional ratio of image and object portions, said exposure mechanism including a pivotal cover mounted on the top of each of said selectable front sections having a transverse slot formed therein permitting said lever to extend upwardly therethrough and a downwardly extending flange adapted to contact shutter-speed control means and fix its position at a given speed setting, and fixed indicia located on said cover adjacent to said slot for setting said lever at a limited number of designated black-and-white film and color film positions.

3. A camera, as defined in claim 2, wherein said cover is adapted to be opened to permit a plurality of additional diaphragm adjustments and a plurality of shutter speed settings.

4. A camera embodying a plurality of interchangeable components for photographing, with extreme accuracy of focus and exposure, a wide variety of objects at given short-range distances in minute detail at a predetermined magnification or other given dimensional ratio of like image and object portions, comprising a rear housing section adapted to carry a photosensitive film material and position it for exposure at a focal plane, a plurality of individually selectable front housing sections each incorporating a lens of relatively different focal length, an intermediate housing section releasably-attachable to and adapted to be positioned between and joined to said rear section and a selected front section, flange means integral with said sections at open faces thereof, said flange means of one section mating with that of another and providing a light-tight seal where said sections are joined together, exposure mechanism and actuating means therefor incorporated with each of said selectable front housing sections including shutter and diaphragm means and a trigger-like shutter release, a pistol grip releasably and selectively-attachable to each of said rear and intermediate housing sections thereby providing a constant spacing relation of said pistol grip and trigger and an even balance in holding said camera irrespective of whether a front section is attached directly to the rear section or to the intermediate section, a plurality of individually selectable distance-determining means releasably-attachable to a given one of said sections for providing a given spacing between said lens and said object to be photographed, and manually-operable latching means incorporated with and predeterminedly distributed between said sections for assembly, disassembly and interchange thereof, comprising a plurality of mutually-engageable fixed and movable latch members.

5. A camera embodying a plurality of interchangeable components for photographing, with extreme accuracy of focus and exposure, a wide variety of objects at given short-range distances in minute detail at a predetermined magnification or other given dimensional ratio of like image and object portions, comprising a rear housing section adapted to carry photosensitive black-and-white and color film materials and position them for exposure at a focal plane, a plurality of individually-selectable front housing sections each incorporating a lens of relatively different focal length, an intermediate housing section releasably-attachable to and adapted to be positioned between said rear section and a selected front section, an exposure mechanism including shutter and diaphragm means and actuating means therefor incorporated with at least one of said sections, a plurality of individually-selectable spacing means releasably-attachable to a given one of said sections for establishing a given distance between said lens and said object to be photographed, manually-operable latching means incorporated with and predeterminedly distributed between said sections for assembly, disassembly and interchange thereof, comprising a plurality of mutually-engageable fixed and movable latch members, and electronic flash means including an annular flash tube, reflector and face plate incorporated with each of said selectable front sections so as to substantially encircle the lens aperture thereof providing, in conjunction with an "X" synchronization of said shutter means, a given level of illumination of said subject which is predetermined in accordance with said spacing between the lens and object, the focal length of a lens of a selected front section, the distance between said lens and focal plane, as provided by an assemblage of said front, intermediate and rear sections, the diaphragm aperture, and the speed characteristics of said black-and-white and color film materials, the length of an optical axis extending within said rear section, said intermediate section and said selected front section, along which image-producing light rays are transmitted, when taken with the focal characteristics of the lens of a selected front section and the distance provided by said spacing means, determining said given magnification and other dimensional ratio of image and object portions.

6. A camera, as defined in claim 5, wherein said electronic flash means includes means for varying said level of illumination to provide a choice of image densities and to compensate for the different film speeds of said black-and-white and color film materials.

7. A camera, as defined in claim 5, wherein said spacing means is attachable to each of said selectable front sections and includes a pair of forwardly-extending, laterally-spaced, metallic plates, the inner facing surfaces of which are highly polished to reflect light rays from said electronic flash means and serve a light propagating and gathering function with respect thereto.

8. A camera, as defined in claim 5, wherein said spacing means is releasably-attachable to each of said front housing sections and includes an aperture formed in a rear surface thereof for accepting said electronic flash means and permitting the transmission of light rays therefrom in a forward direction.

9. A knock-down camera embodying a plurality of interchangeable sectional components for assembly and photographing, with extreme accuracy of focus and exposure, a wide variety of objects at a plurality of given short ranges and at predetermined dimensional ratios of corresponding image and object parts, and for rapidly producing a completed print in black-and-white or color, comprising a rear housing section adapted to carry a plurality of photosensitive black-and-white or color film units of a type including a releasably-confined processing liquid and materials for producing positive images by diffusion transfer, and to position said film units for photographic exposure and, thereafter, to apply a predetermined compression to each unit to release and spread said liquid during its withdrawal, manually, from said rear section, a plurality of individually selectable front housing sections each incorporating a lens of relatively different focal length, an intermediate housing section adapted to be positioned between and releasably-attached to said rear section and a selected front section, an exposure mechanism including shutter and diaphragm means and a trigger-like shutter release incorporated with said selected front section, a pistol grip selectively-attachable to said rear and intermediate sections thereby providing a constant spacing relation of said trigger and pistol grip and an even balance of said camera, a plurality of individually-selectable spacing-and-supporting means comprising a frame-like adapter releasably-attachable to said front section by fastener means of said adapter and section, and a pair of laterally-spaced, plate members integral with and extending forwardly from said adapter and terminating in broad supporting surfaces lying in a plane at 90° to the optical axis of said camera, said spacing-and-supporting means serving, respectively, to establish said given short ranges between the camera lens and an object, to support said camera against a surface including said object and as a stable support, when said camera is positioned vertically, for facilitating an even manual withdrawal of said film units from said rear section during processing thereof, electronic flash means mounted on said front section and adapted to transmit light forwardly between said plate members of said spacing-and-supporting means, and manually-operable latching means comprising a plurality of mutually-engageable fixed and movable latch members incorporated with and distributed between said camera sections for assembly, disassembly and interchange thereof whereby a given front section may be attached directly to said rear section or attached thereto through the intermediary of said intermediate section so as to provide a passage of different optical path-length between said lens and focal plane consistent with the lens of said selected front section and the distance from said lens to said object established by said selected spacing-and-supporting means.

10. A camera, as defined in claim 9, wherein said pistol grip extends in a plane substantially parallel to that including said broad supporting surfaces of said spacing-and-supporting means and serves, in conjunction with said surfaces, as a steadying means during withdrawal of said film units or processing purposes.

11. A camera, as defined in claim 9, wherein said spacing-and-supporting means includes an integral transverse plate extending between said plate members and having an aperture formed therein defining the field of said object to be photographed.

12. A camera, as defined in claim 9, wherein each said selectable front section includes a pair of laterally-spaced, forwardly-extending, knob-like elements and wherein said frame-like adapter of said spacing-and-supporting means includes a pair of laterally-spaced recessed apertures formed in inner metallic portions for receiving said knob-like elements, said apertures having side-engaging finger elements adjacent thereto, said knob-like elements, apertures and fingers constituting said fastener means permitting the releasable attachment of said spacing-and-supporting means to said front section.

13. A light-directing device for attachment to the front of a camera embodying an electronic flash unit located at the sides of its lens aperture and being of a type adapted to photograph at short range, with extreme accuracy of focus and exposure, an image or object such as a fingerprint carried on a relatively smooth reflective surface to substantially avoid undesirable surface reflections from said surface, said device comprising an outer housing including forwardly-flared side wall members and coplanar upper and lower wall members, a pair of spaced transverse front wall members unitary therewith, an inner housing having forwardly-flared wall members adjoining but of a shorter length than said outer housing wall members and differentially angularly disposed relative thereto, the side wall members of said inner housing being spaced from those of said outer housing to form a pair of light-transmitting passages, while the upper and lower wall members diverge so as to meet said upper and lower wall members of the outer housing at locations rearwardly of said spaced transverse front wall members of the outer housing, said inner housing converging rearwardly to a circular transverse plate having an aperture formed therein and diverging forwardly to an open front face, and a pair of right prisms mounted at the front extremities of said passages, said prisms being of a length extending substantially between said upper and lower wall members of said outer housing, said passages being adapted to transmit light rays from said flash unit to said prisms and the latter being adapted to further transmit and reflect said rays oppositely angularly through the aperture provided by said spaced transverse front wall members so as to be obliquely incident upon said object positioned therebetween.

14. A device, as defined in claim 13, for attachment to the front of a camera embodying an electronic flash unit in the form of a ring-light substantially surrounding the lens aperture of said camera, whereby said device blocks the light rays emanating from top and bottom portions of said ring-light by virtue of said upper and lower wall members of said inner housing meeting and being attached to said upper and lower wall members of the outer housing in light-tight relation.

References Cited

UNITED STATES PATENTS

| | | | |
|---|---|---|---|
| 1,236,419 | 8/1917 | Folmer | 95—11 |
| 2,483,482 | 10/1949 | Strobel | 95—11 |
| 2,911,894 | 11/1959 | Hennig | 95—11 |

FOREIGN PATENTS

| | | |
|---|---|---|
| 794,628 | 5/1958 | Great Britain. |

JOHN M. HORAN, *Primary Examiner.*